Aug. 4, 1936.   G. A. LYON   2,049,457
TIRE COVER CONSTRUCTION
Filed Aug. 21, 1933   2 Sheets-Sheet 1
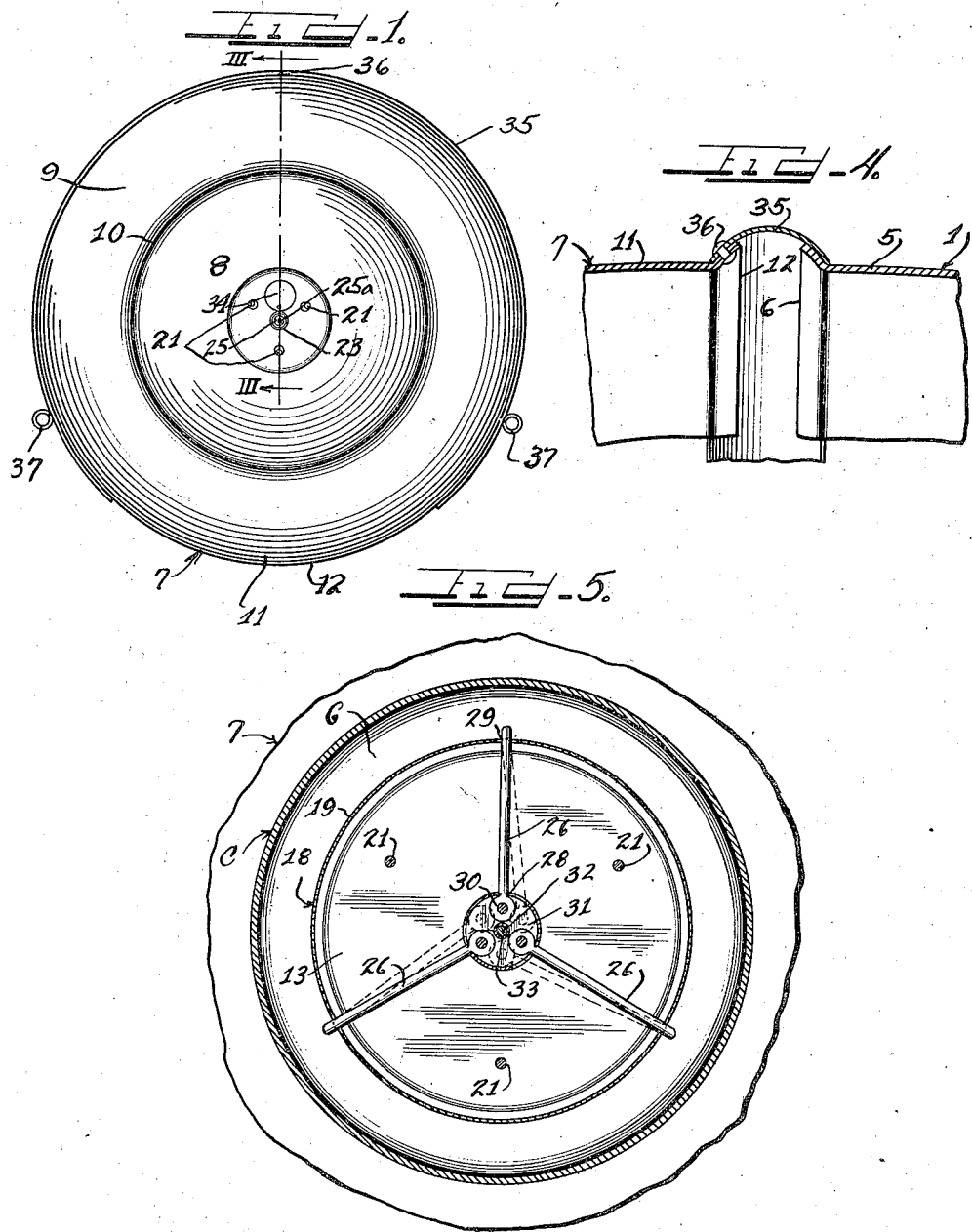

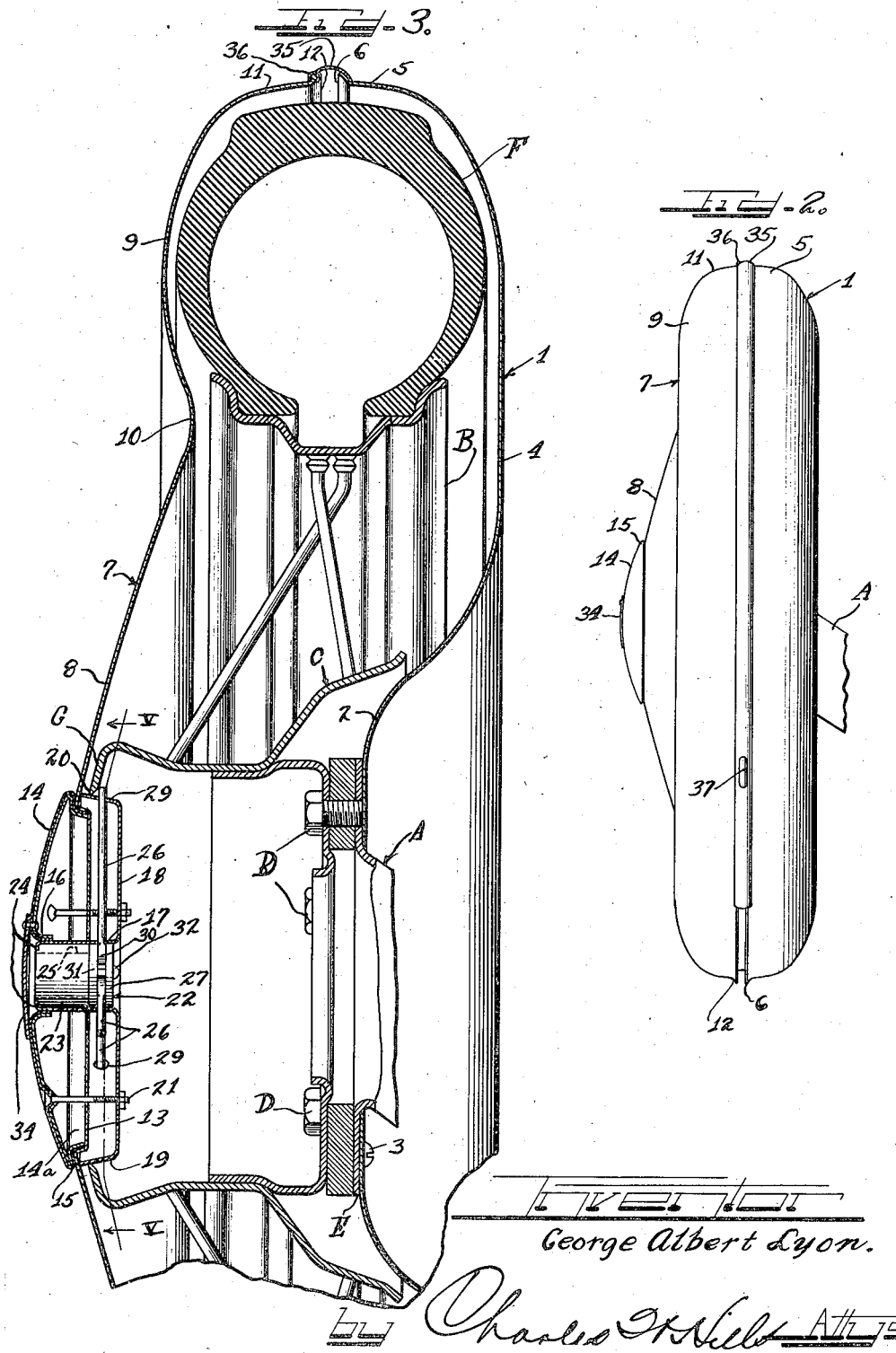

Patented Aug. 4, 1936

2,049,457

UNITED STATES PATENT OFFICE 2,049,457

TIRE COVER CONSTRUCTION

George Albert Lyon, Detroit, Mich., assignor to Lyon Incorporated, Detroit, Mich., a corporation of Delaware Application August 21, 1933, Serial No. 686,086

5 Claims. (Cl. 150—54)

This invention has to do with tire covers and is concerned more particularly with a multi-part cover embodying means for locking the same in position.

It is an object of the invention to provide a cover embodying separable parts, one of which may form a permanent part of an automobile, with means encompassing major portions of the cover parts for resiliently holding them in substantially coaxial relation.

It is another object of the invention to provide a tire cover comprising a stationary part and a relatively movable part, the latter embodying means for locking the same to the hub of the spare wheel carrying the tire, together with means serving the function of bridging the gap between the parts and holding the same in substantially coaxial relation.

In accordance with the general features of the invention, the cover construction comprises a pair of complemental halves, each formed to cover a side of the spare wheel and tire and adjacent tread portion thereof, leaving a narrow portion of the tread adjacent its median plane uncovered, together with a split resilient arcuate metallic strip connected to one of the halves and arranged to bridge the gap between said halves throughout a major portion of the length of the exposed part of the tread. One of the halves is preferably secured to the spare tire carrier in such a manner as to be permanently secured therewith to the automobile, either at the sides or rear or any other suitable part of the automobile body. The other half is relatively movable and includes key-controlled locking mechanism for securing the same to the front part of the spare wheel hub. When the relatively movable half is thus locked to the hub, it prevents access to the spare wheel mounting means and thus serves effectively not only to maintain the entire cover in proper tire protecting position, but also to lock the wheel, tire and cover to the automobile.

The locking means may, if desired, be controlled by a combination of any conventional character, and the tire cover members and lock mechanism housing structure is preferably of form-retaining sheet material, such as sheet metal, although other form-retaining material which serves the purpose may be used.

The structure is extremely simple and the removable half may be removed or applied with the utmost simplicity of operation, and when removed, the wheel mounting means is accessible to permit removal of the spare wheel and tire.

Further objects and advantages of the invention will appear as the description proceeds.

This invention (in a preferred form) is illustrated in the drawings and hereinafter more fully described.

On the drawings

Figure 1 is an elevational view of a tire cover construction embodying the present invention.

Figure 2 is an enlarged right end elevation of the structure shown in Figure 1, the spare wheel carrier being shown fragmentarily.

Figure 3 is an enlarged fragmentary sectional view taken substantially in the plane designated by the line III—III in Figure 1, certain parts being shown for convenience in elevation.

Figure 4 is an enlarged fragmentary sectional view taken in the same plane as Figure 3, but showing a detail thereof.

Figure 5 is a fragmentary sectional view taken substantially in the plane designated by the line V—V in Figure 3.

Referring now more particularly to the drawings, the automotive vehicle spare wheel carrier A is of a character preferably permanently secured to the vehicle body (not shown) either at a side, the rear or any other suitable part of the body. The spare wheel B is shown mounted on the carrier A by means of its hub C and bolts D passing through a wall of the hub and embedded in the carrier. The wheel B illustrated is of the type including spokes, although the invention is to be understood as equally applicable to a wheel of the disc type. One half of a drum or disc type tire cover of preferably form-retaining material, such as sheet metal, is shown at I and comprises an inner portion 2 formed with a central opening to allow the stem of the carrier A to pass therethrough and is secured to a rear wall E as by studs, rivets or the like, one of which is shown at 3. The cover I thus cannot be removed without first removing the carrier, and since the carrier is permanently secured to the automobile body, it follows that the tire cover member I is also permanently secured to the body of the vehicle.

The cover member I includes a side portion 4 which extends from its central portion 2 outwardly sufficiently to cover the rear side of the spare wheel and tire F, and is arranged to be somewhat spaced from said sides as shown in Figure 3. The cover member I terminates outwardly in a transversely curved portion which is spaced from but substantially conforms to the adjacent side wall and tread portions, the outer marginal or rim portion 5 of the cover member 1 extending forwardly somewhat short of the median plane of the tire and terminating in an outwardly inclined flange 6.

For cooperation with the cover member 1 to substantially enclose the spare wheel and the cover, the invention contemplates the provision of a second half cover member 7 for disposition over the front side of the spare wheel and tire. The cover member 7 has its inner portion bulged forwardly toward the center thereof at 8, and its outer portion bulged forwardly and then rearwardly to generally conform to the transverse outer contour of the front side wall and adjacent tread portions of the tire F at 9, providing between said bulged portions an annular depression 10 preferably disposed adjacent the rim of the wheel B. The cover member 7 thus is shaped in general conformity with the front side of the spare wheel and tire. The outer peripheral marginal portion 11 of the cover member 7 terminates, as in the case of the marginal portion 5 of the cover member 1, somewhat short of the median plane of the tire F, in an outwardly inclined flange 12.

The bulged portion 8 is rearwardly depressed centrally at 13 where it preferably receives a cap 14 simulating the head of a hub cap and preferably having the same design as the hub caps of the wheels supporting the vehicle in connection with which the tire cover construction is to be used. The plate 14 is preferably bulged forwardly to harmonize with the bulged portion 8 of the cover member 7, as well as for reinforcement purposes, said plate 14, if desired, being double walled as shown to further resist deformation thereof. The plate-like member 14 is flanged at 15 to overlie and abut the front surface of the bulged portion 8 adjacent the depression 13 to conceal said depression, and is centrally open and flared at 16 rearwardly to receive the cylindrical sleeved forwardly projecting central portion 17 of a cup-shaped housing member 18. The outer peripheral wall 19 of the cup 18 extends forwardly and is substantially frusto-conical and of such dimensions as to wedgingly engage the rim 20 of the front wall G of the hub C. Bolts 21, rivets or the like, pass through aligned holes in the plate member 14, depressed portion 13 and base of the cup 18 and serve to hold the flange or outer wall 19 of the cup 18 in tightly engaged position with the rear surface of the bulge 8 of the tire cover member 7.

A key-controlled locking mechanism is designated generally at 22 and comprises a barrel 23 locked at 24 against rotation relative to the cup sleeve 17, a lock cylinder 25 rotatably but not axially movably carried within the barrel 23, and carrying locking pins or latches 26, and an assembling plate 27. The sleeve 17 and surrounding wall 19 of the cup 18 are provided with a set of registering holes 28 and 29, respectively, of sufficient size to enable the eye 30 of each latch 26 to pass therethrough and also of such size, especially as to the holes 28, as to permit each pin to swing in its movement between locked and released positions, as shown in Figure 5. Said eyes 30 are mounted on pivot studs carried by the flange 31 at the rear of the lock cylinder 25, and the parts are held in assembly by means of the plate 27 through a securing member such as the stud 32 embedded in said flange 31. A spacer sleeve 33 is disposed about the shank of the stud 32 and between the flange 31 and plate 27 for holding said flange and plate apart sufficiently so as not to interfere with the proper pivotal movement of the latches 26 about the studs passing through the eyes 30 thereof.

The latches 26 are preferably arranged in the same plane and so disposed that when they are in their locking positions, they engage the rear surface of the front wall G of the hub C at the time that the frusto-conical peripheral wall 19 of the cup 18 engages the rim 20 of said wall G, to thereby cooperate with the wall 19 in firmly holding the cover member 7 in centered relation to the spare wheel and tire and without rattling.

A swingable cap 34 may be employed to conceal the barrel 23 and lock cylinder 25 when such concealment is desired, and may be swung into open position as shown in Figure 1 to provide access of a key to the key hole 25a in the lock cylinder 25.

It is desirable to provide means for centering the front cover member 7 relative to the hub C so that, when it is desired to mount said member 7 on the hub, the cup 18 will be arranged coaxially with the hub C, so that said cup may be shoved rearwardly into a position such that the latch members 26 are arranged in a plane behind the rim 20. To this end, there is provided a resilient preferably metallic, longitudinally arcuate channel strip 35 which is preferably transversely split to enable the same, by virtue of its resilience, to be expanded and contracted. The strip 35, moreover, is normally of more than 180° in extent and is shaped to overlie and conceal and hug resiliently the outwardly inclined flanges 6 and 12 throughout a commensurate length thereof, thereby to conceal a corresponding length of the otherwise exposed central portion of the tread of the tire. The strip 35, substantially midway of its length, and adjacent a longitudinal margin thereof, is secured as by the rivet 36, spot-welding, or other suitable means to the flange 12 of the releasable cover member 7, the remaining portions of the strip 35 being flexible about the secured part thereof. The strip 35 is shaped preferably to exert an inward pressure on the flange 6 of the relatively stationary cover member 1 to inhibit rattling of the associated cover members therewith.

The strip 35, at points preferably separated along the strip by more than 180°, carries gripping elements 37 engageable by both hands and upon which a spreading force may be exerted to expand the strip 35 sufficiently to enable the same to pass over and onto the flange 6 of the cover member 1 when the cover member 7 is being applied into proper tire protecting position. Likewise, pressure may be exerted upon the finger grips 37 to expand the strip 35 after the latching members 26 are retracted to unlocking positions, to free the cover member 7 of the cover member 1 so that the former cover member may be removed.

In applying the movable cover member 7, the strip 35 is expanded so that when the flange 12 is placed opposite the flange 6, said strip may enclose the portion of the flange 6 in the vicinity of the rivet 36. This may perhaps best be effected by holding the cover member 7 so that the rim portion 11 thereof adjacent the rivet 36 is located radially outwardly of the rim portion 5 of the cover member 1 sufficiently to enable the strip 35 at that location to pass over the flange 6. When the rim portion 11 referred to in the last sentence is dropped inwardly into substantial coaxial relation with the rim portion 5, the cup 18 is substantially coaxially arranged relative to the rim 20 of the hub front wall G, and is positioned therein as shown in Figure 3. By manipulating the key controlled lock cylinder 25 and associated latch elements 26, the latter, through rotation of the cylinder 25, are thrust radially outward in a position to lock behind the wall G as shown in Figure 3. When the cup 18 is positioned as shown, the grip elements 37 are released, whereupon said strip 35 snaps over the remaining portions of the flanges 6 and 12 cooperating therewith as shown in Figures 1 and 2.

The strip 35, in addition to its function in preventing rattling, serves effectively to hold the cover parts 1 and 7 in assembled relation even when the cover member 7 is unlocked from the hub C. Moreover, the strip 35 cooperates with the flanges 6 and 12 in reinforcing the adjacent rim portions 5 and 11, and serves as an ornamental bead or molding to materially improve the appearance of the cover as a whole. For the sake of appearance, the strip 35 may, therefore, if desired, be made of stainless steel or have a shiny surface such as that afforded by chromeplating or the like.

The cover parts 1 and 7 may be provided with surface finishes of a metallic or paint character, as desired.

Although three latch elements 26 are illustrated, the number may be varied as desired, so long as they accomplish the desired results. While the flanges 6 and 12 are illustrated as terminating adjacent the median plane of the tire, it is nevertheless well within the province of the invention to arrange said juxtaposed flanges at other locations transversely of the tread, such as points adjacent one or the other margin of the tread.

The tire cover members 1 and 7 are preferably formed of such size as to accommodate the largest size tire that may be employed in connection with the particular automotive vehicle with which this cover structure is employed, the structural features being such that no adjustment whatever is necessary to enable the cover to accommodate tires of different sizes.

The cover structure may also be such as to accommodate any size tire whatever, or, if desired, may be of such size as to accommodate a variety of sizes of tires within any desired range, requiring one size cover, for small tires and a larger size for large tires, for example.

The plate structure 14 for simulating the hub cap to be employed in connection with wheels supporting the vehicle may be of any desired size, but preferably is of such construction that its rearwardly extending flange 14a fitting in the depression 13 is of one size regardless of the size of the front part thereof, so that the same size depression 13 may accommodate hub cap plates 14 of different sizes and designs.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In combination with an automotive vehicle body having means for supporting a spare wheel, a cover comprising a member carried by the body and shaped to cover the rear side of a spare tire carried by the wheel, and having its outer margin disposed adjacent the tire tread, a second member shaped to cover the front side of the tire and extending over the tread and having its outer margin terminating adjacent the first margin, and an expansible and contractible resilient split ring formed to extend transversely beyond and overlap the margins of said members, whereby the second member may be supported by the first member, and theftproof means for locking the second member to the hub of the wheel.

2. In combination with an automotive vehicle body having means for supporting a spare wheel, a cover comprising a member carried by the body and shaped to cover the rear side of a spare tire carried by the wheel, and having its outer margin disposed adjacent the tire tread, a second member shaped to cover the front side of the tire and extending over the tread and having its outer margin terminating adjacent the first margin, and an expansible and contractible resilient split ring formed to extend transversely beyond and overlap the margins of said members, whereby the second member may be supported by the first member, and theftproof means arranged centrally of the second member for locking the second member to the hub of the wheel, said ring cooperating with said members to dispose said means at the hub, whereby said means may be readily interlocked with said hub.

3. In combination with an automotive vehicle body having a spare wheel carrier; a cover for a spare tire carried by the wheel, said cover including a member shaped to conform longitudinally and transversely to a part of the tire, and a releasable connection between the carrier and said member for releasably supporting said member from the carrier, locking means carried centrally by said member for interlocking with the hub of the wheel to support the member directly from the hub, said connection including means for positioning said locking means relative to the hub so as to enable a ready interlocking of the locking means with the hub.

4. In combination with an automotive vehicle body having a spare wheel carrier; a cover for a spare tire carried by the wheel, said cover including a member shaped to conform longitudinally and transversely to a part of the tire, and a releasable connection between the carrier and said member for releasably supporting said member from the carrier, key-controlled locking means carried centrally by said member for interlocking with the hub of the wheel to support the member directly from the hub, said connection including means for positioning the locking means relative to the hub so as to enable a ready interlocking of the locking means with the hub.

5. In combination in a spare wheel assembly including a wheel having a hub and a support on the vehicle to which said hub is adapted to be secured, a spare tire cover including a back part disposed over the rear side of the tire and tire tread and connected to said support to be carried thereby, a front part disposed over the outer side of the tire and having its outer portion connected to a tread covering portion of said rear part so as to be supported thereby and centered on the tire, and means centrally of said front part, adapted to be brought into alignment with said wheel hub when said outer portion of said front part is connected to said rear part, and which means includes inwardly projecting means for securing the central means of the front part to said hub.

GEORGE ALBERT LYON.